(12) United States Patent
Marui et al.

(10) Patent No.: US 10,029,212 B2
(45) Date of Patent: Jul. 24, 2018

(54) HOLLOW-FIBER MEMBRANE ELEMENT AND MEMBRANE MODULE FOR FORWARD OSMOSIS

(71) Applicant: TOYOBO CO., LTD., Osaka-shi, Osaka (JP)

(72) Inventors: Katsushige Marui, Iwakuni (JP); Koji Tokunaga, Iwakuni (JP); Yasuki Terashima, Iwakuni (JP); Hajime Suenaga, Iwakuni (JP); Atsuo Kumano, Iwakuni (JP)

(73) Assignee: TOYOBO CO., LTD., Osaka (JP)

( * ) Notice: Subject to any disclaimer, the term of this patent is extended or adjusted under 35 U.S.C. 154(b) by 175 days.

(21) Appl. No.: 14/914,566

(22) PCT Filed: Oct. 21, 2014

(86) PCT No.: PCT/JP2014/077910
§ 371 (c)(1),
(2) Date: Feb. 25, 2016

(87) PCT Pub. No.: WO2015/060286
PCT Pub. Date: Apr. 30, 2015

(65) Prior Publication Data
US 2016/0207000 A1    Jul. 21, 2016

(30) Foreign Application Priority Data
Oct. 21, 2013 (JP) ................................. 2013-218311

(51) Int. Cl.
*B01D 63/02* (2006.01)
*B01D 61/00* (2006.01)

(52) U.S. Cl.
CPC ......... *B01D 63/025* (2013.01); *B01D 61/002* (2013.01)

(58) Field of Classification Search
CPC ........................... B01D 61/002; B01D 63/025
See application file for complete search history.

(56) References Cited

U.S. PATENT DOCUMENTS

| 6,709,598 | B1 | 3/2004 | Pearl |
| 6,824,679 | B1 * | 11/2004 | Dzengeleski ........ B01D 63/021 156/169 |
| 2013/0037479 | A1 | 2/2013 | Hayashi et al. |

FOREIGN PATENT DOCUMENTS

| JP | 49-94580 A | 9/1974 |
| JP | 53-37183 A | 4/1978 |

(Continued)

OTHER PUBLICATIONS

Office Action dated Jun. 27, 2017, issued in counterpart Japanese Application No. 2015-543861, with English translation. (4 pages).

(Continued)

*Primary Examiner* — Dirk Bass
(74) *Attorney, Agent, or Firm* — Westerman, Hattori, Daniels & Adrian, LLP

(57) ABSTRACT

A hollow-fiber membrane element for forward osmosis which is a both open-ended hollow-fiber membrane element in which both ends of a wound hollow-fiber membrane body are opened, the wound hollow-fiber membrane body having hollow-fiber membranes arranged in an intersecting manner by winding the hollow-fiber membranes around a porous distribution pipe in a helical manner, wherein a) the number of winds per element length in a region from the outermost layer of the wound hollow-fiber membrane body to at least one eighth of the thickness of the wound hollow-fiber membrane body is 0.33 to 1.75, and b) the number of winds per element length in a region from the innermost layer of the wound hollow-fiber membrane body to at least one fourth of the thickness of the wound hollow-fiber membrane body is greater than 1.75.

12 Claims, 5 Drawing Sheets

(56) References Cited

FOREIGN PATENT DOCUMENTS

| | | |
|---|---|---|
| JP | 2-2833 A | 1/1990 |
| JP | 3-14492 B2 | 2/1991 |
| JP | 2001-521814 A | 11/2001 |
| JP | 2003-290632 A | 10/2003 |
| WO | 97/30779 A1 | 8/1997 |
| WO | 99/22851 A1 | 5/1999 |
| WO | 2012/002263 A1 | 1/2012 |

OTHER PUBLICATIONS

Extended (supplementary) European Search Report dated May 15, 2017, issued in counterpart European Patent Application No. 14855020.5. (7 pages).
International Search Report dated Jan. 27, 2015, issued in counterpart Application No. PCT/JP2014/077910 (2 pages).

* cited by examiner

HOLLOW-FIBER MEMBRANE ELEMENT AND MEMBRANE MODULE FOR FORWARD OSMOSIS

TECHNICAL FIELD

The present invention relates to a hollow-fiber membrane element and a membrane module for forward osmosis having excellent fouling resistance, little pressure loss in flow in the bore of the hollow-fiber membrane, and a high water permeation flow rate through the membrane. More specifically, the present invention is capable of volume reduction by concentration or recovery of organic matters or concentration of discharged water, desalination of seawater, or generation of energy by causing fresh water to permeate due to the difference in concentration between a low concentration aqueous solution and a pressurized high concentration aqueous solution as the driving force, and rotating the turbine by the flow rate and the pressure on the side of the pressurized high concentration aqueous solution that are increased by the penetrated fresh water. In particular, the present invention can be used for a fresh water generating treatment for generating energy such as electric power by utilizing the osmotic pressure due to the difference in concentration between seawater or concentrated seawater and fresh water.

BACKGROUND ART

Separation and concentration of a liquid mixture by a membrane separation method, which does not involve phase change, is energy-saving compared with conventional separation techniques such as distillation, and is widely used in various fields including food fields such as concentration of fruit juice, and separation of beer yeast, and recovery of organic matters from industrial waste water because it does not involve state change of a substance. The water treatment using a membrane has become established as an essential process for supporting the leading-edge technology.

Such a water treatment using a membrane is conducted by using a membrane module in which a membrane element consisting of an assembly of membranes as one constituent is changed in a pressure vessel. In particular, a hollow-fiber membrane element is advantageous in that high water permeation flow rate is achieved as a whole and the volume efficiency is very high because a large membrane area can be ensured per volume of the membrane module although the water permeation flow rate per unit membrane area is not high compared with a spiral membrane element, and is excellent in compactness. In addition, when both a high concentration aqueous solution and fresh water are fed into the module and they are brought into contact with each other via a semipermeable membrane, the concentration polarization on the membrane surface can be controlled low.

In the case of a hollow-fiber reverse osmosis membrane, a both open-ended membrane is employed from the aspect of efficiency (see Patent Literatures 1 and 2). As shown in the illustration of FIG. 1, for example, the current of the membrane-permeated water in that case flows into the hollow-fiber membrane (inside the bore) from outside the same, and flows out through the opening part of each end. The flow length traveled by the membrane-permeated water in the bore is about half the total length of the hollow-fiber membrane as is apparent from FIG. 1. In this case, since seawater flows outside the hollow-fiber membrane, and the outside of the hollow-fiber membrane is pressurized, the current in the direction of pressurizing to adhere contaminants against the membrane surface occurs, and contamination components in the seawater are captured and deposited between neighboring hollow-fiber membranes to pollute the membrane element. This tends to adversely influence on the performance.

Also in the case of a hollow-fiber forward osmosis membrane, a both open-ended membrane is employed (see Patent Literature 3). The current of the membrane-permeated water in this case flows from inside (inside the bore) to outside the hollow-fiber membrane, for example, as shown in the illustration of FIG. 2. For example, in the case where a draw solution (DS; seawater) of high osmotic pressure flows outside the hollow-fiber membrane, and a feed liquid (FS; fresh water) of low osmotic pressure flows the bore of the hollow-fiber membrane, the membrane-permeated water flows from inside to outside the hollow-fiber membrane. In this case, the fresh water which is the source of the membrane-permeated water flows the bore of the hollow-fiber membrane as is apparent from FIG. 2, and flows from one end to the other end of the hollow-fiber membrane, and the flow length thereof is equivalent to the total length of the hollow-fiber membrane. Therefore, pressure loss in flow in the bore in the case of the forward osmosis membrane (FO membrane) is significantly larger than that in the case of the reverse osmosis membrane (RO membrane).

In the case of an RO membrane, in order to prevent membrane contamination by the membrane-permeated water of the hollow-fiber membrane, fouling resistance is improved by arranging the hollow-fiber membranes constituting the membrane element in an intersecting manner, for example, in Patent Literature 1. Specifically, by forming an intersecting part of hollow-fiber membranes, a gap between hollow-fiber membranes is produced, and thus occurrence of a channeling flow or concentration polarization is prevented, and muddy components of seawater are difficult to be pooled on the outside surface of hollow-fiber membranes. In this case, a larger number of winds per element length of the hollow-fiber membranes arranged in an intersecting manner is preferred, and as a result, the number of intersecting parts of hollow-fiber membranes increases, and the fouling resistance is improved. In Patent Literature 1, as is apparent from a drawing, an RO membrane having a number of winds of two is disclosed. Also in Patent Literature 2, an RO membrane having a number of winds of two is specifically disclosed.

When the structure of an intersecting arrangement with a number of winds of two is employed in the case of an FO membrane, the pressure loss of FS flowing in the bore is large, and water permeation performance possessed by the hollow-fiber membrane is not satisfactorily exerted. This is because the pressure loss in flow of FS flowing in the bore of the hollow-fiber membrane is large, and in particular, in the case of forward osmosis, the influence on the pressure loss in flow by a larger number of winds is about twice the case of the RO membrane. Therefore, the intersecting arrangement of hollow-fiber membranes employed in the RO membrane cannot be directly employed in the FO membrane.

As described above, it is the current state of art that no useful means for improving the fouling resistance of hollow-fiber membranes for FO has been found, and the measure achieving the fouling resistance while ensuring sufficient water permeation performance has not been realized even if the intersecting arrangement of hollow-fiber membranes for RO is taken into account.

CITATION LIST

Patent Document

PTD 1: Patent Publication No. 3-14492
PTD 2: Japanese Patent Laying-Open No. 2003-290632
PTD 3: WO2012/002263

SUMMARY OF INVENTION

Technical Problem

The present invention was devised in light of the aforementioned current state of the conventional art, and it is an object of the present invention to provide a hollow-fiber membrane element for forward osmosis having excellent fouling resistance and little pressure loss in flow (i.e., sufficient water permeation flow rate), and a membrane module including the same.

Solution to Problem

The present inventors further diligently examined about the intersecting arrangement employed in an RO membrane for achieving the aforementioned object. As a result, they found that when hollow-fiber membranes for forward osmosis are arranged in an intersecting manner, deterioration in fouling resistance is significantly smaller compared with the case of reverse osmosis even when the number of winds of the outer layer part of a wound hollow-fiber membrane body of long hollow-fiber membrane is reduced to some extent because the direction of flow of the membrane-permeated water is reverse to that of the reverse osmosis membrane, and found that in this way, influence of reduction in water permeation flow rate by high pressure loss in flow can be reduced to an inevitable level, and accomplished the present invention.
That is, the present invention has the following aspects (1) to (7).

(1) A hollow-fiber membrane element for forward osmosis comprising a porous distribution pine and a wound hollow-fiber membrane body which is a both open-ended hollow-fiber membrane arranged in an intersecting manner by winding the hollow-fiber membranes around the porous distribution pipe in a helical manner, wherein a) the number of winds per element length in a region from the outermost layer of the wound hollow-fiber membrane body to at least one eighth of the thickness of the wound hollow-fiber membrane body is 0.33 to 1.75, and b) the number of winds per element length in a region from the innermost layer of the wound hollow-fiber membrane body to at least one fourth of the thickness of the wound hollow-fiber membrane body is greater than 1.75.

(2) The hollow-fiber membrane element according to (1), wherein the number of winds per element length in a region from the outermost layer of the wound hollow-fiber membrane body to maximally three quarter of the thickness of the wound hollow-fiber membrane body is 0.33 to 1.75.

(3) The hollow-fiber membrane element according (1) or (2), wherein the hollow-fiber membrane element has an outer diameter greater than or equal to 130 mm.

(4) The hollow-fiber membrane element according to any one of (1) to (3), wherein the hollow-fiber membrane is formed of at least one resin selected from the group consisting of a cellulose acetate resin, a polyamide resin, and a sulfonated polysulfone resin.

(5) The hollow-fiber membrane element according to any one of (1) to (4), wherein the hollow-fiber membrane has an outer diameter of 160 to 270 µm.

(6) The hollow-fiber membrane element according to any one of (1) to (5), wherein the wound hollow-fiber membrane body has an outer diameter of 130 to 420 mm, and a length of 0.2 to 1.6 m.

(7) A hollow-fiber membrane module including comprising a vessel and at least one hollow-fiber membrane element according to any one of (1) to (6) charged in the vessel.

Advantageous Effects of Invention

In the hollow-fiber membrane element and the hollow-fiber membrane module of the present invention, since the number of winds per element length is considerably smaller than that of the conventional one for reverse osmosis, particularly in the outer layer part where the hollow-fiber membrane is long, it is possible to reduce the influence of pressure loss in flow of a fluid in the bore during forward osmotic operation, and as a result, it is possible to obtain a high water permeation flow rate through the membrane. Also, when the number of winds is reduced within the range defined by the present invention, high fouling resistance is maintained during the forward osmotic operation in contrast to the case of the reverse osmosis.

DESCRIPTION OF EMBODIMENTS

Figure 1:
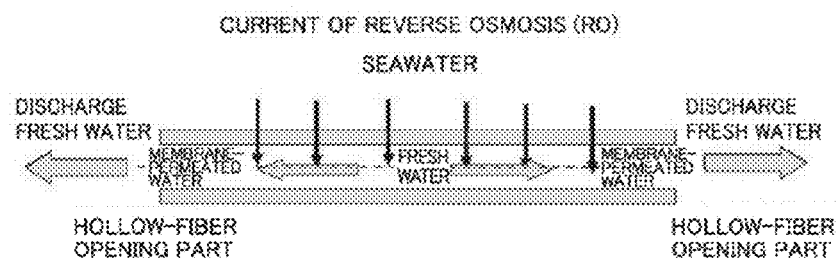
FIG. 1 is a diagram illustrating the current of membrane-permeated water in the case of a hollow-fiber reverse osmosis membrane.

Hereinafter, the hollow-fiber membrane element and the membrane module for forward osmosis of the present invention will be specifically described.

Forward osmosis in which the membrane element of the present invention is used is a water treatment method utilizing the phenomenon that when a high-concentration aqueous solution with high osmotic pressure and a low-concentration aqueous solution with low osmotic pressure are brought into contact with each other via a semipermeable membrane, the fresh water moves from the aqueous solution with low osmotic pressure to the aqueous solution with high osmotic pressure. For example, when the high-concentration aqueous solution with high osmotic pressure flows outside the hollow-fiber membrane, and the low-concentration aqueous solution with low osmotic pressure flows in the bore of the hollow-fiber membrane, the amount of water flowing inside the bore reduces and the water permeation flow rate through the membrane reduces if the pressure loss in flow inside the bore is large. When seawater flows outside the hollow-fiber membrane as the high-concentration aqueous solution with high osmotic pressure, contaminants adhere or deposit between hollow-fiber membranes or on the membrane surface, and the water permeation flow rate reduces with time.

The hollow-fiber membrane element of the present invention can ensure a larger membrane area per element compared with a spiral flat membrane. For the elements of almost the same size, the hollow-fiber membrane can have a membrane area of about 10 times that of the spiral membrane although it differs depending on the size of the hollow-fiber membrane. Therefore, the hollow-fiber membrane requires a very small treatment amount per unit membrane area for obtaining the same water permeation flow rate, and can reduce the contamination on the membrane surface occurring at the time when the feed water permeates the membrane in comparison with the spiral membrane, and thus can extend the operation time until cleaning of the membrane. Further, since a channeling flow is unlikely to occur in the element, it is preferred in conducting a water treatment by using difference in concentration as a driving force.

A material for the hollow-fiber membrane of the present invention is not particularly limited as long as high separation performance of the level comparable to the reverse osmosis membrane is realized, and for example, resins such as cellulose acetate resins, polyamide resins, polyvinyl alcohol resins, and sulfonated polysulfone resins can be used. Among these, cellulose acetate resins, and sulfonated polysulfone resins such as sulfonated polysulfone and sulfonated polyether sulfone are preferred in that they are tolerant to chlorine which is an antiseptic, and can easily suppress proliferation of microorganisms. In particular, they can effectively suppress the microbial contamination on the membrane surface. As the cellulose acetate, cellulose triacetate is preferred in view of durability.

The outer diameter of the hollow-fiber membrane of the present invention is preferably 160 to 270 μm. If the outer diameter is smaller than the aforementioned range, the inner diameter is necessarily small, and thus the same problem as in the aforementioned inner diameter can occur. In contrast, if the outer diameter is larger than the aforementioned range, the membrane area per unit volume in the module cannot be made large, and the compactness which is one of the merits of the hollow-fiber membrane module is impaired.

The hollowness of the hollow-fiber membrane of the present invention is preferably 20 to 42%. If the hollowness is smaller than the aforementioned range, the pressure loss in flow of the bore is large, and a desired water permeation flow rate may not be obtained. Contrarily, if the hollowness is larger than the aforementioned range, sufficient pressure resistance may not be ensured even for use in the forward osmotic treatment.

The hollowness (%) can be determined by the following formula.

$$\text{Hollowness (\%)} = (\text{Inner diameter}/\text{Outer diameter})^2 \times 100$$

It is only required that the inner diameter of the hollow-fiber membrane of the present invention falls within the range that satisfies the hollowness for the aforementioned preferred outer diameter. The inner diameter is preferably 70 to 175 μm. If the inner diameter is smaller than the aforementioned range, the pressure loss of the fluid flowing in the bore is generally large, and hence when the length of the hollow-fiber membrane is set relatively long, an excessively high pressure is required for flowing a desired amount of fresh water, and this can cause the loss of energy. In contrast, if the inner diameter is larger than the aforementioned range, a trade-off relationship between the hollowness and module membrane area arises, and the necessity of sacrificing either the durability at working pressure, or membrane area per unit volume can arise.

Figure 3:
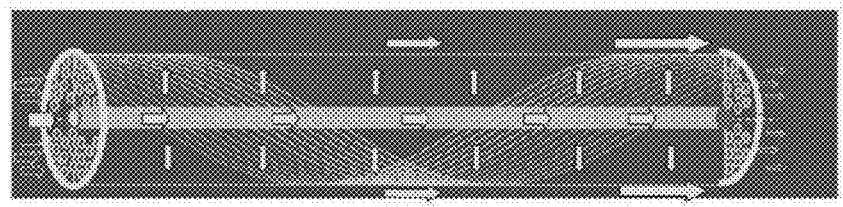
FIG. 3 is a diagram illustrating one example of a hollow-fiber membrane element of the present invention.
Figure 3:
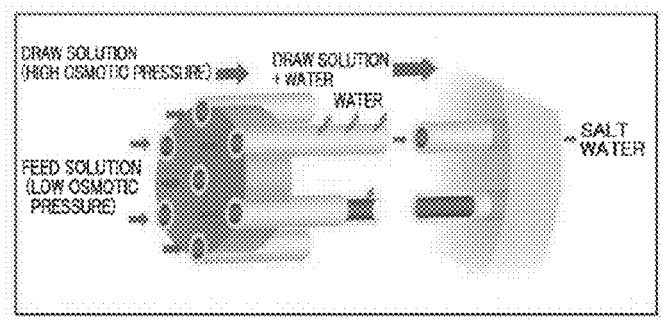

In the hollow-fiber membrane element of the present invention, after sealing both ends of the wound hollow-fiber membrane body with a resin, part of the resin is cut to open both the ends of the hollow-fiber membrane, and the wound hollow-fiber membrane body is formed by winding up hollow-fiber membranes or bundles of hollow-fiber membranes around a porous distribution pipe in a spiral manner to stack hollow-fiber membranes in the radial direction. In that case, the hollow-fiber membranes are arranged in an intersecting manner. FIG. 3 is a schematic view of one example of the hollow-fiber membrane element of the present invention in which hollow-fiber membranes are arranged in an intersecting manner. By employing the intersecting arrangement, gaps are regularly formed at intersecting parts between hollow-fiber membranes. Existence of these regular gaps prevents insoluble components or particulate components in the fluid flowing outside the hollow-fiber membrane from being captured between hollow-fiber membranes, and hinders increase in pressure loss. In contrast, when the hollow-fiber membranes are arranged in parallel, variations between hollow-fiber membrane gaps is likely to arise when closest packing is not achieved, and insoluble components or particulate components in the fluid are captured between hollow-fiber membranes, and this can cause increase in pressure loss and occurrence of a channeling flow. Therefore, by arranging the hollow-fiber membranes in an intersecting manner, a permissible amount of contaminants composed of insoluble components of the fluid flowing outside the hollow-fiber membrane is larger in comparison with the case of the parallel arrangement, and as a result, the fouling resistance of the hollow-fiber membrane element improves. Regarding the formation of the intersecting arrangement, when the hollow-fiber membrane is thin and is insufficient in strength, the similar effect is obtained by forming the arrangement from a bundle of hollow-fiber membranes as a unit.

The porous distribution pipe is a tubular member having a function of distributing the fluid fed through a feed fluid inlet to the hollow-fiber membrane assembly in feeding a feed liquid outside the hollow-fiber membranes. The porous distribution pipe is preferably located in the center part of the hollow-fiber membrane assembly. If the diameter of the porous distribution pipe is too large, the region in the membrane module occupied by the hollow-fiber membranes reduces, and thus the membrane area of the membrane element or the membrane module reduces, and this may deteriorate the water permeation flow rate per volume. In contrast, if the diameter of the porous distribution pipe is too small, the pressure loss is large when the feed fluid flows in the porous distribution pipe, and as a result, the effective differential pressure on the hollow-fiber membranes is reduced, and the treatment efficiency may be decreased. The strength also decreases, and the porous distribution pipe can be damaged by the tension of the hollow-fiber membranes when the feed fluid flows in the hollow-fiber membrane layer. It is important to set an optimum diameter while taking these influences into account comprehensively. The area proportion of the section area occupied by the porous distribution pipe in the section area of the hollow-fiber membrane element is preferably 4 to 20%.

The outer diameter of the wound hollow-fiber membrane body is preferably 130 to 420 mm. If the outer diameter is too large, the operability in maintenance such as membrane replacing operation can be impaired. If the outer diameter is too small, the membrane area per unit membrane element reduces, and the treatment amount decreases, and hence this is not preferred in terms of economy.

The length of the wound hollow-fiber membrane body is preferably 0.2 to 1.6 m. If this length is too large, the pressure loss in flow in the hollow interior of the hollow-fiber membrane is large, and forward osmosis performance can be deteriorated. If the length is too small, the membrane area per unit membrane element reduces, and the treatment amount decreases, and hence this is not preferred in terms of economy.

The packing density of hollow-fiber membranes in the wound hollow-fiber membrane body is preferably 40 to 65%. If the packing density is too large, the gap between hollow-fiber membranes is too small, and the effect of the intersecting arrangement is difficult to appear. If the packing density is too small, the number of hollow-fiber membranes is small and the membrane area is small, and hence the treatment amount is small. This is unfavorable in terms of economy. The packing density is a percentage of the total area occupied by the outer diameter of the hollow-fiber membrane relative to the cross-sectional area of the wound body in the cross section that is perpendicular to the center axis of the wound hollow-fiber membrane body, and can be calculated by the following formula.

Packing density (%)=(Outer diameter (m) of hollow-fiber membrane)$^2$×π/4×Number of hollow-fiber membranes/Cross-sectional area (m$^2$) of wound body×100

The hollow-fiber membrane element of the present invention principally features that the number of winds per element length of hollow-fiber membranes arranged in an intersecting manner is 0.33 to 1.75 in the region from the outermost layer of the wound hollow-fiber membrane body to at least one eighth of the thickness of the wound hollow-fiber membrane body (outer layer part). The number of winds is more preferably 0.5 to 1.5. The number of winds used herein means the number of winds made during traveling from one end to the other end of the wound hollow-fiber membrane body in forming the aforementioned intersecting arrangement. The larger the number of winds is, the larger the number of intersecting parts between hollow-fiber membranes is. For example, when the number of winds is 1.0, the axial position of the intersecting part is the center part of the wound body. When the number of winds is 1.5, two intersecting parts are formed in the axial direction, and when the number of winds is 2.0, three intersecting parts are formed in the axial direction. The angle formed between a hollow-fiber membrane and the center axis of the wound body is small in the inner layer of the wound hollow-fiber membrane body, and is larger in a part closer to the outer layer part. The angle is determined by the length and the outer diameter of the wound body.

The region of the outer layer part where the number of winds is set small is more effective when it is on the outer side where the length of the hollow-fiber membrane is large, and is set as a part at least one eighth of the thickness of the wound body from the outermost layer. For example, when the diameter of the element is about 130 mm, the number of winds can be set small in the part from the outermost layer to about one eighth of the thickness of the wound body. In contrast, in the case of an element having a relatively large diameter, such as an element having an outer diameter of 420 mm, it is preferred to make the number of winds small in the part from the outermost layer to one quarter, one third or maximally three quarter of the thickness of the wound body. The form in which the number of winds decreases stepwise toward the outside of the wound body in such a manner that the number of winds is set in the range of 0.33 to 0.75 in the part from the outermost layer to one quarter of the thickness of the wound body, the number of winds is set in the range of 0.75 to 1.25 in the part from more than one quarter to one half of the thickness of the wound body from the outermost layer, and the number of winds is set in the range of 1.25 to 1.75 in the part from more than one half to three quarter of the thickness of the wound body from the outermost layer, is also within the scope of the present invention. Although no significant problem arises when the present invention is applied to an element of small diameter, it is preferred to apply the present invention to an element having a diameter of greater than or equal to 130 mm because the effect of the present invention clearly appears.

Meanwhile, when the region with a low number of winds is extended to the inner layer part where the length of the hollow-fiber membrane is small, the effect of reducing the pressure loss is small, and the fouling resistance can be deteriorated. Therefore, it is preferred that the number of winds of the inner layer part is greater than 1.75.

Figure 2:
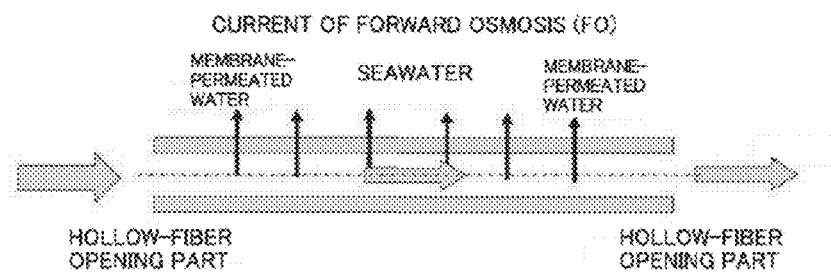
FIG. 2 is a diagram illustrating the current of membrane-permeated water in the case of a hollow-fiber forward osmosis membrane.

While the hollow-fiber membrane element wherein hollow-fiber membranes are arranged in an intersecting manner has been conventionally proposed for reverse osmotic use, in any of conventional proposals, the number of winds is larger than the range defined by the present invention, and to be more specific, the number of winds is 2. When the intersecting arrangement of the conventional hollow-fiber membrane in which the number of winds is 2 is directly employed in the hollow-fiber membrane element for forward osmosis of the present invention, it is impossible to ensure a sufficient water permeation flow rate because the pressure loss in flow of the fluid flowing in the bore is too large, although high fouling resistance can be obtained. This is because, as is apparent from the comparison between FIG. 1 and FIG. 2, there is a difference of about twice in the flow length of the fluid flowing in the bore of the hollow-fiber membrane between reverse osmosis and forward osmosis, and forward osmosis is largely influenced by the pressure loss in flow caused by the increase in the number of winds. In particular, in the outer layer part of the hollow-fiber membrane element where the length of the hollow-fiber membrane is large, the influence increases. Therefore, it is necessary to set the number of winds in the outer layer part as small as within the upper limit of the range of the present invention defined in the above so as not to be greatly influenced by the pressure loss in flow. In contrast, when the number of winds is set small, the fouling resistance significantly deteriorates for reverse osmotic use, however, in forward osmotic use, deterioration in fouling resistance due to reduction in the number of winds is significantly smaller than in reverse osmotic use. This is attributed to the difference in flowing direction of the membrane-permeated water between reverse osmosis and forward osmosis. To be more specific, as is apparent from FIG. 1 and FIG. 2, in the case of reverse osmosis, by pressurizing seawater flowing outside the hollow-fiber membrane, fresh water in the seawater penetrates the membrane, so that contaminants are likely to be captured and deposited between hollow-fiber membranes. In contrast, the forward osmosis features that contaminants are difficult to deposit on the membrane surface because the fresh water in the fluid flowing in the bore of the hollow-fiber membrane passes through the hollow-fiber membrane, although the seawater flows outside the hollow-fiber membrane in the same manner. It is to be noted that the number of winds is required to be set greater than or equal to the lower limit of the range of the present invention as defined above because too small a number of winds causes deterioration in the fouling resistance even in forward osmotic use.

The hollow-fiber membrane of the present invention can be produced, for example, in the manner as described in Japanese Patent Publication No. 3591618, which includes ejecting a membrane forming solution composed of cellulose triacetate, ethylene glycol (EG), and N-methyl-2-pyrrolidone (NMP) from a tripartition nozzle, causing the solution to be dipped in a liquid coagulant composed of water/EG/NMP after passing through the air traveling part to obtain a hollow-fiber membrane, washing the hollow-fiber membrane with water, and conducting a heat treatment to produce a cellulose acetate hollow-fiber membrane. A polyamide hollow-fiber membrane can also be produced by purifying a copolymerized polyamide obtained by low-temperature solution polymerization from terephthaloyl dichloride, 4,4'-diaminodiphenylsulfone and piperazine, then dissolving the purified copolymerized polyamide in a dimethylacetamide solution containing $CaCl_2$ and diglycerin to prepare a membrane forming solution, ejecting the membrane forming solution from a tripartition nozzle into a liquid coagulant through an air traveling part, washing the obtained hollow-fiber membrane with water, and conducting a heat treatment to produce a polyamide hollow-fiber membrane.

The hollow-fiber membrane of the present invention obtained in the manner as described above is incorporated into a hollow-fiber membrane element by a conventionally known method. For incorporating hollow-fiber membranes, for example, as described in Japanese Patent Nos. 4412486, 4277147, 3591618, 3008886 and so on, 45 to 90 hollow-fiber membranes are collected to give one hollow-fiber membrane assembly, a plurality of the hollow-fiber membrane assemblies are arranged laterally to give a flat bundle of hollow-fiber membranes, and the resultant bundle is wound on a porous distribution pipe having many pores while it is traversed. By adjusting the length and the rotation speed of the porous distribution pipe, and the traverse speed of the bundle of hollow-fiber membranes at this time, the bundle is wound up so that the intersecting part is situated at a specific position on the circumferential face of the wound body. Next, both ends of the wound body are glued, then both the sides are cut to form opening parts of the hollow-fiber membranes, and thus the hollow-fiber membrane element is fabricated.

Figure 4:
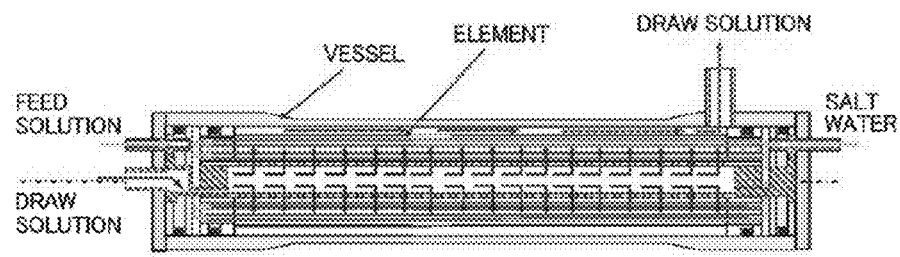
FIG. 4 is a diagram illustrating one example of a hollow-fiber membrane module of the present invention.
Figure 5:
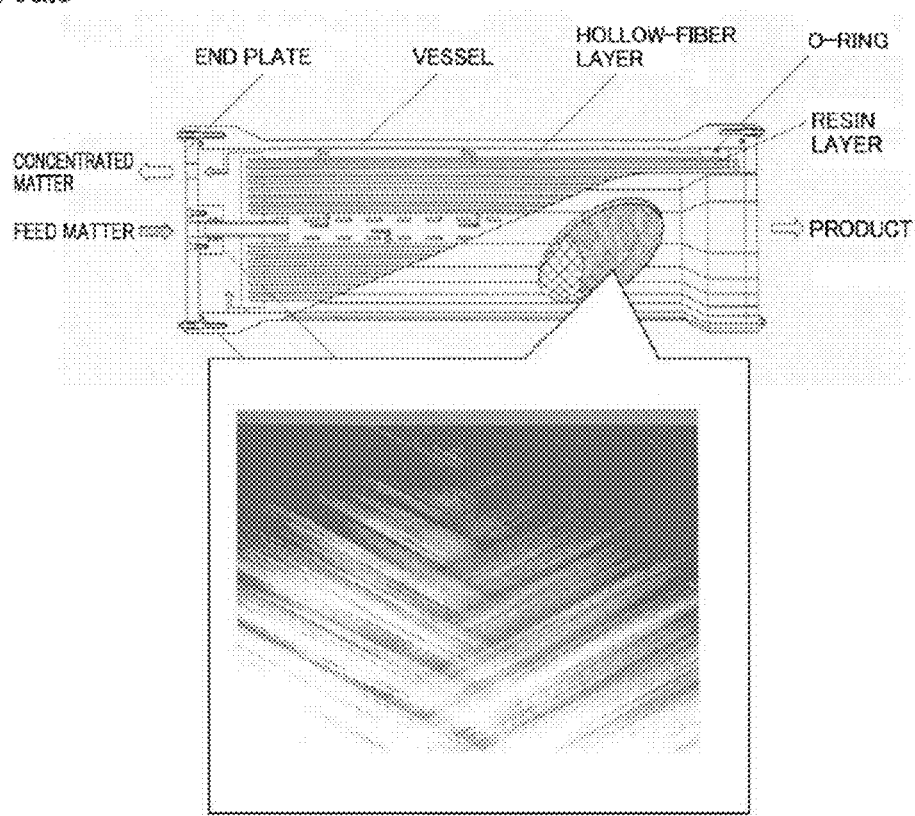
FIG. 5 is a picture showing one example of an intersecting arrangement configured by a bundle of hollow-fiber membranes as a unit.
Figure 6:
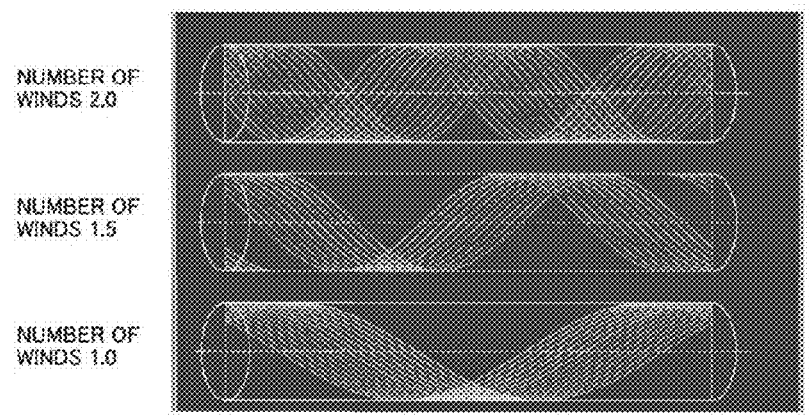
FIG. 6 is a schematic diagram showing the states of a hollow-fiber membrane when the number of winds is 2.0, 1.5, and 1.0.

One or more hollow-fiber membrane elements for forward osmosis of the present invention fabricated in the manner as described above can constitute a hollow-fiber membrane module for forward osmosis by being charged in a vessel, particularly a pressure vessel having pressure resistance to the operation pressure. The hollow-fiber membrane module for forward osmosis has four nozzles as shown in FIG. 4. Two of these are an inlet nozzle and an outlet nozzle for a high-concentration solution having high osmotic pressure, and the high-concentration solution communicates with the space that is in liquid contact with outside the hollow-fiber membrane, the inlet nozzle communicates with an inlet of the porous distribution pipe of the element, and the outlet nozzle communicates with the space that is in liquid contact with the outermost layer part of the hollow-fiber membrane element. Meanwhile, the remaining two nozzles are an inlet nozzle and an outlet nozzle of low-concentration fresh water having low osmotic pressure, and communicate with the space that is in liquid contact with the open ends of the bore of the hollow-fiber membrane.

Figure 7:
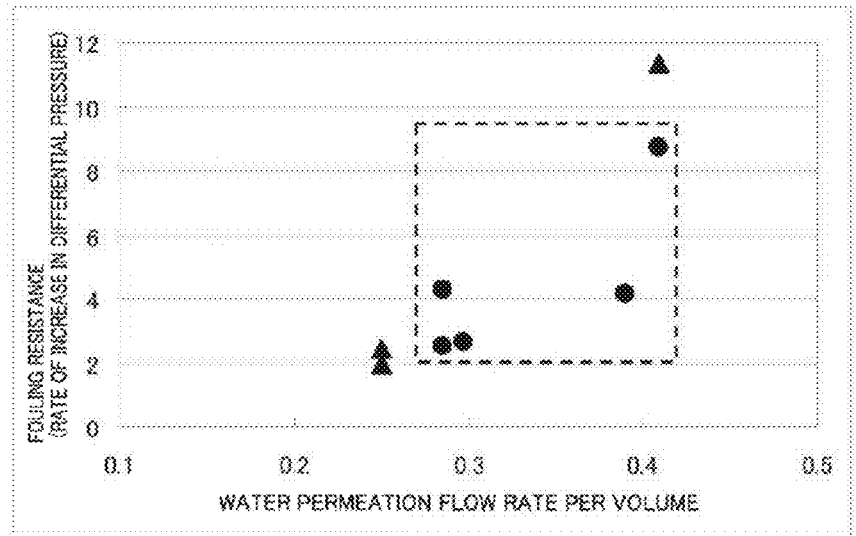
FIG. 7 is a graph showing the influence of the number of winds regarding the relationship between the water permeation flow rate per volume of the hollow-fiber membrane element of the present invention, and the fouling resistance.

Based on the result of examples as will be described later, a graph indicating the relationship between the water permeation flow rate per membrane element volume and the fouling resistance (rate of increase in differential pressure) is shown in FIG. 7. As is apparent from this graph, it can be read that the water permeation flow rate per membrane element volume and the rate of increase in differential pressure exponentially increase as the number of winds of the outer layer part is reduced with respect to the conventional membrane element for RO (the number of winds (WD) is 2). For example, when the number of winds is changed to 1.5 from 2, the water permeation flow rate per membrane element volume is about 1.2 times the former, and when the number of winds is changed to 0.5, the water permeation flow rate is about as high as 1.7 times the former. Meanwhile, the rate of increase in differential pressure tends to rapidly increase around the point where the number of winds is less than 1. Considering from the inclination of the curve, it is easily expected that the variation in performance between membrane elements increases when the number of winds is set to be too small. For this reason, in the present invention, the number of winds of the membrane element capable of suppressing the rate of increase in differential pressure as much as possible while ensuring a higher water permeation flow rate is set in the range of 0.33 to 1.75, preferably in the range of 0.5 to 1.5. The numerical values themselves of the water permeation flow rate per membrane element and the rate of increase in differential pressure are not particularly meaningful because they depend on the performance of the hollow-fiber membranes.

Figure 8:
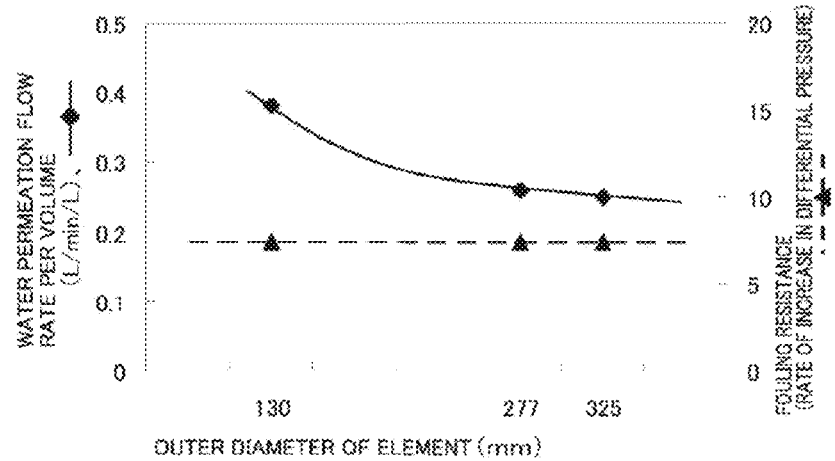
FIG. 8 is a graph showing the influence of the diameter of the element, regarding the relationship between the water permeation flow rate per volume of the hollow-fiber membrane element of the present invention, and the fouling resistance.
Figure 9:
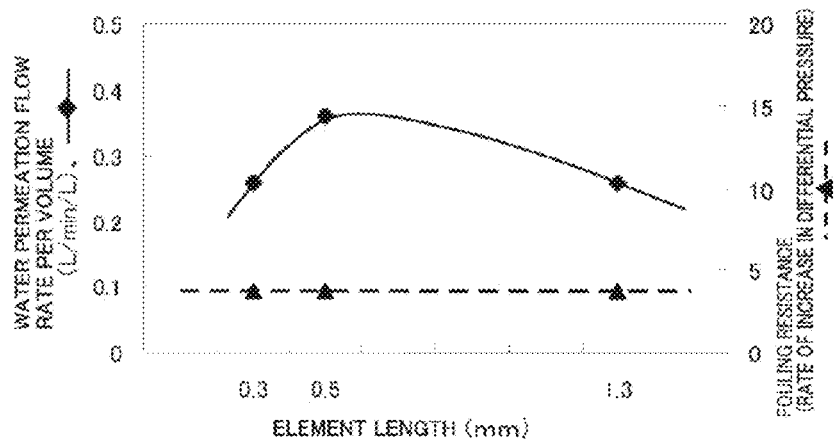
FIG. 9 is a graph showing the influence of the length of the element, regarding the relationship between the water permeation flow rate per volume of the hollow-fiber membrane element of the present invention, and the fouling resistance.
Figure 10:
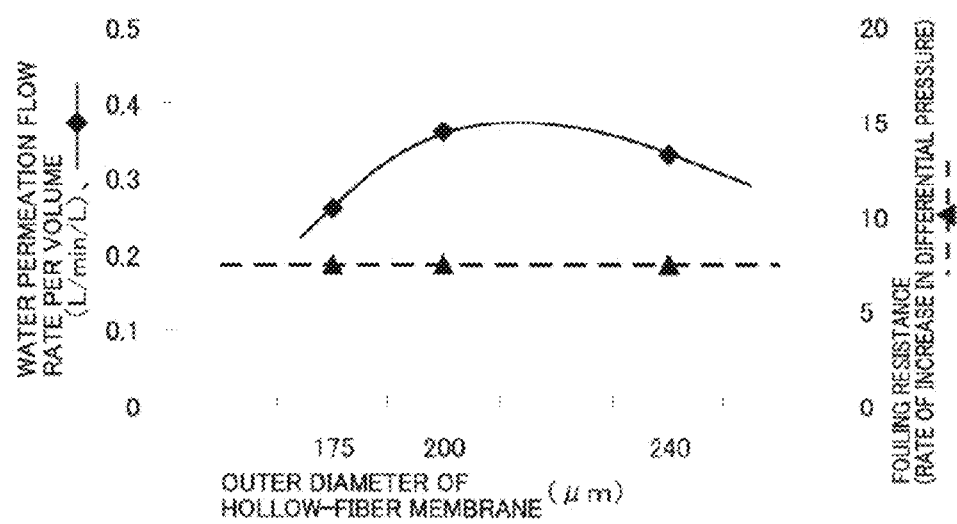
FIG. 10 is a graph showing the influence of the outer diameter of the hollow-fiber membrane, regarding the relationship between the water permeation flow rate per volume of the hollow-fiber membrane element of the present invention, and the fouling resistance.

As parameters that influence on the water permeation flow rate per membrane element volume and the rate of increase in differential pressure, relationships with the diameter of the membrane element, the length of the membrane element, and the outer diameter of the hollow-fiber membrane were also examined. The results are shown in the graphs of FIGS. 8 to 10. Although variations in these parameters do not influence on the rate of increase in differential pressure, they influence on the water permeation flow rate per membrane element. For example, FIG. 8 illustrates the influence by change in the diameter of the membrane element, and as the diameter of the membrane element increases, the water permeation flow rate per membrane element volume gradually decreases and eventually almost levels off. In other words, a smaller diameter of the membrane element is preferred because the water permeation flow rate per membrane element increases. However, when the diameter of the membrane element is small, the intended effect of the present invention of reducing the pressure loss in flow of the bore of the hollow-fiber membrane is not exerted, and hence the diameter of the membrane element is preferably greater than or equal to 130 mm. Also, a larger diameter of the membrane element is preferred because the effect of the present invention becomes dominant, however, from the view point of ease of production of the membrane element, it would be about 420 mm at most.

FIG. 9 illustrates the influence by the length of the membrane element. As the length of the membrane element increases, the water permeation flow rate per membrane element volume peaks at a specific length, and as the length further increases, the water permeation flow rate tends to decrease gradually. Here, it can be found that as the length of the membrane element that expresses the performance better than that of the conventional RO module (Comparative Example 1), about 0.2 m to 1.6 m is preferred.

FIG. 10 illustrates the influence by the outer diameter of the hollow-fiber membrane. The water permeation flow rate increases as the outer diameter of the hollow-fiber membrane increases, however, the water permeation flow rate degreases gradually as the outer diameter of the hollow-fiber membrane exceeds a specific value. This is attributed to the fact that for a fixed volume of the membrane element, the membrane area decreases as the outer diameter of the hollow-fiber membrane increases. Reading the outer diameter of the hollow-fiber membrane at which the effect of the present invention is exerted from FIG. 10, it can be realized that those having an outer diameter ranging from about 160 μm to 270 μm express the performance over the conventional RO module (Comparative Example 1).

The hollow-fiber membrane module for forward osmosis fabricated in this manner can produce water permeation flow rate as an osmotic flow from the osmotic pressure difference produced by the difference in salt concentration of water flowing outside and inside (bore) the hollow-fiber membrane. As a result, by drawing out fresh water from a low concentration feed liquid or drawing out fresh water, it is possible to concentrate the low concentration feed liquid, or to recover the energy from the osmotic flow. To be more specific, by bringing a pressurized high osmotic pressure aqueous solution (seawater) and low osmotic pressure fresh water at low pressure into contact with each other via a forward osmosis membrane, the fresh water at low pressure flows into the high osmotic pressure aqueous solution at high pressure through the membrane, and a turbine or the like is rotated by the pressurized aqueous solution, and thus energy can be recovered.

EXAMPLES

Hereinafter, the present invention will be described more specifically by way of examples, however, the present invention is not limited to these examples. The characteristic values in examples were measured according to the following methods.

(1) Measurement of Inner Diameter, Outer Diameter, and Hollowness

The inner diameter and the outer diameter of the hollow-fiber membranes can be obtained by inserting several hollow-fiber membranes in a hole of ϕ3 mm pierced in the center of a slide glass in such a manner that the hollow-fiber membranes do not slip through, cutting the hollow-fiber membranes along the upper and lower surfaces of the slide glass with a razor to obtain a cross-sectional sample of the hollow-fiber membrane, and measuring the short axis and the long axis of the cross section of the hollow-fiber membrane by using a projector Nikon PROFILE PROJECTOR V-12. For one cross section of the hollow-fiber membrane, short axes and long axes in two directions were measured, and the arithmetic mean values of these were each determined as the short axis and the long axis of one cross section of the hollow-fiber membrane. For five cross sections, measurement was conducted in the same manner, and the mean values were taken as the inner diameter and the outer diameter.

The hollowness was calculated by (inner diameter/outer diameter)$^2 \times 100$.

(2) Measurement of Element Length

A hollow-fiber membrane element was prepared by sealing both ends of a wound hollow-fiber membrane body with a resin, and cutting part of the resin to open both the ends of the hollow-fiber membrane. A linear distance parallel with the center axis from one open end to the other open end of the hollow-fiber membrane element was measured and determined.

(3) Measurement of Diameter of Element

The diameter of the open end formed by sealing the hollow-fiber membrane element with a resin was measured.

(4) Measurement of Membrane Area Per Element

The membrane area was determined from the outer diameter of the hollow-fiber membrane, the number of hollow-fiber membranes existing in the hollow-fiber membrane element, and the mean effective length of the hollow-fiber membrane.

Membrane area (m$^2$)=π×Outer diameter (m) of hollow-fiber membrane×Number of hollow-fiber membranes×Mean effective length (m) of hollow-fiber membrane The mean effective length of the hollow-fiber membrane was calculated in the following manner.

The distance between insides of the resins in the ends of the element, namely apparent effective length (LE) of the hollow-fiber membrane, the outer diameter (DO) of the element body part, and the outer diameter (DI) of the porous distribution pipe were measured, and these measured values together with the number of winds (WD) were substituted into the following formula, and thus the mean effective length can be calculated.

$$LO2 = (LE)^2 + (\pi \times DO \times WD)^2$$

$$LI2 = (LE)^2 + (\pi \times DI \times WD)^2$$

Mean effective length=$((LO2)^{0.5} + (LI2)^{0.5})/2$ (5) Measurement of Element Volume The volume of the element was determined from the diameter of the membrane element and the length of the membrane element.

Element volume (m$^3$)=π×(Outer diameter (m) of element end)$^2$/4×Element length (m)

(6) Measurement of Number of Winds

The number of winds was determined from the number of times of winds (number of times of turns) with respect to the center axis from one end to the other end of the hollow-fiber membrane of the wound body.

(7) Measurement of Packing Density

The packing density was determined by dividing the total volume of the hollow-fiber membranes existing in the wound hollow-fiber membrane body (on the basis of the outer diameter of the hollow-fiber membrane) by the volume of the wound hollow-fiber membrane body.

Packing density (%)=π×(Outer diameter of hollow-fiber membrane)$^2$/4(m$^2$)×Total length of hollow-fiber membrane (m)/Volume of wound hollow-fiber membrane body (m$^3$)×100%

Volume of wound hollow-fiber membrane body=π× $(DO)^2$×$(LE)$

Total length of hollow-fiber membrane=Mean effective length×Number of hollow-fiber membranes (8) Measurement of Water Permeation Flow Rate One hollow-fiber membrane element was charged in a pressure vessel to fabricate a hollow-fiber membrane module, and from one of the nozzles that communicate with respective opening parts of the hollow-fiber membrane, fresh water having a sodium chloride concentration of 0.2 g/L was fed by a feed pump, and the fresh water was discharged from the other nozzle. Meanwhile, a high-concentration aqueous solution having a sodium chloride concentration of 70 g/L was fed to the porous distribution pipe communicating with outside the hollow-fiber membrane by means of a feed pump, caused to pass through outside the hollow-fiber membrane, and then discharged from the nozzle disposed on the lateral surface of the pressure vessel communicating with outside the hollow-fiber membrane assembly, and the pressure and the flow rate were adjusted by the flow rate adjusting valve. Letting the feed pressure of the high-concentration aqueous solution be PDS1 (MPa), the feed flow rate be QDS1 (L/min), the discharge amount of the high-concentration aqueous solution be QDS2 (L/min), the feed flow rate of the fresh water be QFS1 (L/min), the discharge flow rate of the fresh water be QFS2 (L/min), and the discharge pressure of the fresh water be PFS2 (kPa), the increment of flow rate of the high-concentration aqueous solution (QDS2−QDS1) in that condition was measured as the water permeation flow rate of the module. The temperature was adjusted to 25° C.

PDS1=2.2 MPa
PFS2=less than or equal to 10 kPa $QDS1/(QDS2-QDS1)=2$ $QFS2/(QDS2-QDS1)=0.1$ The inlet pressure of fresh water was set at 0.1 MPa, and when it exceeded 0.1 MPa, QFS1 was set so that it was 0.1 MPa.

The rate of increase in the water permeation flow rate on the basis of the water permeation flow rate of Comparative Example 1 (RO module of conventional type) was calculated for each example according to the following formula.

Rate of increase in water permeation flow rate (%)= (Water permeation flow rate in Example 1−Water permeation flow rate in Comparative Example 1)/Water permeation flow rate in Comparative Example 1×100   Example)

(9) Measurement of Fouling Resistance

A continuous operation was conducted in the same operation condition as that in the measurement of the water permeation flow rate except that highly-contaminated mimic seawater for measurement of fouling resistance was used in place of the high-concentration aqueous solution, and change in differential pressure (PDS1−PDS2) between feed pressure (PDS1) and outlet pressure (PDS2) of the high-concentration aqueous solution or the like was measured. A ratio between the differential pressure after 100 hours, and the differential pressure in the case of the high-concentration aqueous solution was considered as a rate of increase in differential pressure, and the contamination condition of the hollow-fiber membrane element was measured. The composition of the highly-contaminated mimic seawater was 70 g/L of sodium chloride, 0.8 g/L of sodium alginate, colloidal silica (PL-7) 90 mg-$SiO_2$/L, and 10 mg/L of iron (II) chloride hexahydrate in reverse osmosis membrane treatment water.

Example 1

A membrane forming stock solution was obtained by dissolving 41% by weight of cellulose triacetate (CTA, DAICEL CHEMICAL INDUSTRIES, LTD., LTD., LT35), 50% by weight of N-methyl-2-pyrrolidone (NMP, Mitsubishi Chemical Corporation), 8.7% by weight of ethyleneglycol (EG, Mitsubishi Chemical Corporation), and 0.3% by weight of benzoic acid (NACALAI TESQUE, INC.) uniformly at 180° C. The obtained membrane forming stock solution was defoamed under reduced pressure, ejected into a space isolated from the outside air at 163° C. from an arc-shaped (tripartition) nozzle, retained in the air for 0.33 seconds, and then dipped in a coagulation bath of NMP/EG/water=4.25/0.75/95 at 12° C. Subsequently, the hollow-fiber membrane was washed in a multistage tilting bucket water washing method, and was shaken off in a wet condition. The obtained hollow-fiber membrane was dipped in water at 90° C., and treated with hot water for 20 minutes.

The obtained hollow-fiber membrane had an inner diameter of 85 μm and an outer diameter of 175 μm.

The obtained hollow-fiber membranes were arranged in an intersecting manner around a porous distribution pipe to form an assembly of hollow-fiber membranes. The hollow-fiber membranes were arranged in an intersecting manner by winding them around the porous distribution pipe by traversing a bundle of hollow-fiber membranes while rotating the porous distribution pipe about its axis. Both ends of the assembly of hollow-fiber membranes was fixed by potting with epoxy resin, and then both the ends of the resin parts were cut to open the bores of the hollow-fiber membranes, and thus a hollow-fiber membrane element was fabricated.

The obtained hollow-fiber membrane element had a number of winds per element length of 0.5 in the region spanning from the outermost layer of the wound hollow-fiber membrane body to three quarter of the thickness of the wound body (outer layer part), and a number of winds per element length of 2.0 in the remaining part (inner layer part), and had a length of about 70 cm, an outer diameter of 130 mm, a packing density of hollow-fiber membranes of 51%, and a membrane area of 67 m$^2$. The hollow-fiber membrane element was charged in a pressure vessel to make a module, and various tests were conducted. The results are shown in Table 1 together with the details of the hollow-fiber membrane and the element.

Example 2

A hollow-fiber membrane element was fabricated by using hollow-fiber membranes similar to those in Example 1 in the same manner as in Example 1 except that the number of winds of the outer layer part was changed to 1.0. This hollow-fiber membrane element was charged in a pressure vessel to make a module, and various tests were conducted. The results are shown in Table 1 together with the details of the hollow-fiber membrane and the element.

Example 3

A hollow-fiber membrane element was fabricated by using hollow-fiber membranes similar to those in Example 1 in the same manner as in Example 1 except that the number of winds of the outer layer part was changed to 1.5. This hollow-fiber membrane element was charged in a pressure vessel to make a module, and various tests were conducted. The results are shown in Table 1 together with the details of the hollow-fiber membrane and the element.

Example 4

A hollow-fiber membrane element was fabricated by using hollow-fiber membranes similar to those in Example 1 in the same manner as in Example 1 except that the number of winds per element length in the outer layer part (the region spanning from the outermost layer of the wound hollow-fiber membrane body to one eighth of the thickness of the wound body) was changed to 1.0, and the number of winds in the remaining part (inner layer part) was changed to 2.0. This hollow-fiber membrane element was charged in a pressure vessel to make a module, and various tests were conducted. The results are shown in Table 1 together with the details of the hollow-fiber membrane and the element.

Example 5

A hollow-fiber membrane element was fabricated by using hollow-fiber membranes similar to those in Example 1 in the same manner as in Example 1 except that the outer diameter of the element was changed to 420 mm, the number of winds per element length in the outer layer part (the region spanning from the outermost layer of the wound hollow-fiber membrane body to three quarter of the thickness of the wound body) was changed to 1.0, and the number of winds in the remaining part (inner layer part) was changed to 2.0. This hollow-fiber membrane element was charged in a pressure vessel to make a module, and various tests were conducted. The results are shown in Table 1 together with the details of the hollow-fiber membrane and the element.

Comparative Example 1

A hollow-fiber membrane element was fabricated by using hollow-fiber membranes similar to those in Example 1 in the same manner as in Example 1 except that the number of winds was changed to 2.0 both in the inner layer part and in the outer layer part. This hollow-fiber membrane element was charged in a pressure vessel to make a module, and various tests were conducted. The results are shown in Table 1 together with the details of the hollow-fiber membrane and the element.

Comparative Example 2

A hollow-fiber membrane element was fabricated by using hollow-fiber membranes similar to those in Example 1 in the same manner as in Example 1 except that the number of winds of the outer layer part was changed to 0.25. This hollow-fiber membrane element was charged in a pressure vessel to make a module, and various tests were conducted. The results are shown in Table 1 together with the details of the hollow-fiber membrane and the element.

Comparative Example 3

A hollow-fiber membrane element was fabricated by using hollow-fiber membranes similar to those in Example 1 in the same manner as in Example 1 except that the number of winds in the outer layer part (the region spanning from the outermost layer of the wound hollow-fiber membrane body to one tenth of the thickness of the wound body) was changed to 1.0, and the number of winds in the remaining part (inner layer part) was changed to 2.0. This hollow-fiber membrane element was charged in a pressure vessel to make a module, and various tests were conducted. The results are shown in Table 1 together with the details of the hollow-fiber membrane and the element.

Example 6

After purifying a copolymerized polyamide obtained from terephthaloyl dichloride, 70 mol % of 4,4'-diaminodiphenylsulfone, and 30 mol % of piperazine by a low temperature solution polymerization method, 36 parts by weight of the copolymerized polyamide was dissolved at 80° C. in a dimethylacetamide solution containing 4 parts by weight (with respect to polymer) of $CaCl_2$ and 3.6 parts by weight (with respect to polymer) of diglycerin, to prepare a membrane forming solution. After defoaming the resultant solution, the solution was ejected from a tripartition nozzle, allowed to travel in the air, and then dipped in a liquid coagulant cooled to 4 to 6° C. to obtain a hollow-fiber membrane. Then, the obtained hollow-fiber membrane was washed with water, and then heated at 75 to 85° C. for 30 minutes. The obtained hollow-fiber membrane had an inner diameter of 100 μm, and an outer diameter of 200 μm.

The obtained hollow-fiber membranes were arranged in an intersecting manner around a porous distribution pipe to form an assembly of hollow-fiber membranes. The hollow-fiber membranes were arranged in an intersecting manner by winding them around the porous distribution pipe by traversing a bundle of hollow-fiber membranes while rotating the porous distribution pipe about its axis. Both ends of the assembly of hollow-fiber membranes was fixed by potting with epoxy resin, and then both the ends of the resin parts were cut to open the bores of the hollow-fiber membranes, and thus a hollow-fiber membrane element was fabricated.

The obtained hollow-fiber membrane element had a number of winds of 1.0 in an outer layer part (region spanning from the outermost layer of the wound hollow-fiber membrane body to three quarter of the thickness of the wound body), a number of winds of 2.0 in the remaining part (inner layer part), a length of about 70 cm, an outer diameter of 130 mm, a packing density of hollow-fiber membranes of 51%, and a membrane area of 58 $m^2$. The hollow-fiber membrane element was charged in a pressure vessel to make a module, and various tests were conducted. The results are shown in Table 1 together with the details of the hollow-fiber membrane and the element.

Example 7

Sulfonated polyarylether sulfone (SPN-23) obtained by copolymerizing 11.5 mol % of 3,3'-disulfo-4,4'-dichlorodiphenylsulfone disodium salt (S-DCDPS), 38.5 mol % of 2,6-dichlorobenzonitrile (DCBN), and 50 mol % of 4,4'-biphenol was preliminarily dried at 110° C. for 12 hours, 80 parts by weight thereof was weighed out, and sequentially 108 parts by weight of NMP and 12 parts by weight of EG were stirred and dissolved at 170° C. to obtain a membrane forming solution.

The membrane forming solution was kept at 150° C., and ejected from a tube-in-orifice nozzle with EG as an inner liquid. The ejected solution traveled an air gap length of 20 mm, and was then dipped in a coagulation bath containing salt water having a concentration of 3.5% by weight. Subsequently, the hollow-fiber membrane was washed in a multistage tilting bucket water washing method, and was shaken off in a wet condition. The obtained hollow-fiber membrane was dipped in salt water having a concentration of 14.5% by weight, and annealed at 98° C. for 20 minutes.

The obtained hollow-fiber membranes were arranged in an intersecting manner around a porous distribution pipe to form an assembly of hollow-fiber membranes. The hollow-fiber membranes were arranged in an intersecting manner by winding them around the porous distribution pipe by traversing a bundle of hollow-fiber membranes while rotating the porous distribution pipe about its axis. Both ends of the assembly of hollow-fiber membranes was fixed by potting with epoxy resin, and then both the ends of the resin parts were cut to open the bores of the hollow-fiber membranes, and thus a hollow-fiber membrane element was fabricated.

The obtained hollow-fiber membrane element had a number of winds of 1.0 in an outer layer part (region spanning from the outermost layer of the wound hollow-fiber membrane body to three quarter of the thickness of the wound body), a number of winds of 2.0 in the remaining part (inner layer part), a length of about 70 cm, an outer diameter of 130 mm, a packing density of hollow-fiber membranes of 51%, and a membrane area of 71 m². The hollow-fiber membrane element was charged in a pressure vessel to make a module, and various tests were conducted. The results are shown in Table 1 together with the details of the hollow-fiber membrane and the element.

As is apparent from Table 1, the hollow-fiber membrane elements in Examples 1 to 7 satisfy both the high water permeation flow rate (high water permeation flow rate per volume) and fouling resistance (low rate of increase in module differential pressure). In contrast, Comparative Example 1 is influenced by pressure loss due to the large length of the hollow-fiber membrane of the outer layer part, and shows low water permeation flow rate although it shows excellent fouling resistance. Comparative Example 2 is practically problematic because the fouling resistance is low although the water permeation flow rate is high. Comparative Example 3 showed no significant effects both in terms of the water permeation flow rate and the fouling resistance because the number of winds was reduced only in the region spanning from the outermost layer of the wound body to no more than one tenth of the thickness of the wound body.

INDUSTRIAL APPLICABILITY

The hollow-fiber membrane element for forward osmosis of the present invention is very useful for a water treatment for forward osmosis and in the field of generating energy using concentration difference as a driving force because it

TABLE 1

| | Outer layer part | | Inner layer part | | Hollow-fiber membrane | | Element | | |
|---|---|---|---|---|---|---|---|---|---|
| | Thickness | Number of winds | Thickness | Number of winds | Outer diameter μm | Inner diameter μm | Outer diameter mm | Length m | Effective length m |
| Example 1 | 3/4 | 0.5 | 1/4 | 2 | 175 | 85 | 130 | 0.7 | 0.58 |
| Example 2 | 3/4 | 1 | 1/4 | 2 | 175 | 85 | 130 | 0.7 | 0.58 |
| Example 3 | 3/4 | 1.5 | 1/4 | 2 | 175 | 85 | 130 | 0.7 | 0.58 |
| Example 4 | 1/8 | 1 | 7/8 | 2 | 175 | 85 | 130 | 0.7 | 0.58 |
| Example 5 | 3/4 | 1 | 1/4 | 2 | 175 | 85 | 420 | 0.7 | 0.58 |
| Comparative Example 1 | 3/4 | 2 | 1/4 | 2 | 175 | 85 | 130 | 0.7 | 0.58 |
| Comparative Example 2 | 3/4 | 0.25 | 1/4 | 2 | 175 | 85 | 130 | 0.7 | 0.58 |
| Comparative Example 3 | 1/10 | 1 | 9/10 | 2 | 175 | 85 | 130 | 0.7 | 0.58 |
| Example 6 | 3/4 | 1 | 1/4 | 2 | 200 | 100 | 130 | 0.7 | 0.58 |
| Example 7 | 3/4 | 1 | 1/4 | 2 | 165 | 64 | 130 | 0.7 | 0.58 |

| | Element | | | | | Rate of increase in water permeation flow rate (vs. Comparative Example 1) % | Fouling resistance Rate of increase in differential pressure |
|---|---|---|---|---|---|---|---|
| | Number number | Hollow-fiber membrane Mean effective length m | Packing density % | Membrane area m² | Volume L | Water permeation flow rate per volume L/min/L | |
| Example 1 | 204,000 | 0.60 | 51 | 67 | 9.3 | 0.41 | 64 | 8.8 |
| Example 2 | 196,700 | 0.63 | 51 | 67 | 9.3 | 0.39 | 56 | 4.2 |
| Example 3 | 186,200 | 0.65 | 51 | 67 | 9.3 | 0.30 | 20 | 2.7 |
| Example 4 | 180,000 | 0.68 | 51 | 67 | 9.3 | 0.29 | 16 | 2.5 |
| Example 5 | 1,457,300 | 0.86 | 51 | 678 | 97 | 0.29 | 16 | 4.3 |
| Comparative Example 1 | 174,500 | 0.70 | 51 | 67 | 9.3 | 0.25 | — | 2.0 |
| Comparative Example 2 | 208,700 | 0.60 | 51 | 67 | 9.3 | 0.41 | 64 | 11.4 |
| Comparative Example 3 | 179,000 | 0.68 | 51 | 67 | 9.3 | 0.25 | 0 | 2.4 |
| Example 6 | 150,600 | 0.63 | 51 | 58 | 9.3 | 0.39 | 56 | 4.2 |
| Example 7 | 221,300 | 0.63 | 51 | 71 | 9.3 | 0.39 | 56 | 4.2 | is designed to have a structure having high water permeation performance of membrane and excellent fouling resistance.

The invention claimed is:

1. A hollow-fiber membrane element for forward osmosis comprising a porous distribution pipe and a wound hollow-fiber membrane body which is a both open-ended hollow-fiber membrane arranged in an intersecting manner in which the hollow-fiber membranes are wound around the porous distribution pipe in a helical manner, wherein
   a) the number of winds per element length in a region from an outermost layer of the wound hollow-fiber membrane body to at least one eighth of the thickness of the wound hollow-fiber membrane body is 0.33 to 1.75, and
   b) the number of winds per element length in a region from an innermost layer of the wound hollow-fiber membrane body to at least one fourth of the thickness of the wound hollow-fiber membrane body is greater than 1.75.

2. The hollow-fiber membrane element according to claim 1, wherein the number of winds per element length in a region from the outermost layer of the wound hollow-fiber membrane body to maximally three quarters of the thickness of the wound hollow-fiber membrane body is 0.33 to 1.75.

3. The hollow-fiber membrane element according to claim 1, wherein element has an outer diameter greater than or equal to 130 mm.

4. The hollow-fiber membrane element according to claim 1, wherein the hollow-fiber membrane is formed of at least one resin selected from the group consisting of a cellulose acetate resin, a polyamide resin, and a sulfonated polysulfone resin.

5. The hollow-fiber membrane element according to claim 1, wherein the hollow-fiber membrane has an outer diameter of 160 to 270 μm.

6. The hollow-fiber membrane element according to claim 1, wherein the wound hollow-fiber membrane body has an outer diameter of 130 to 420 mm, and a length of 0.2 to 1.6 m.

7. A hollow-fiber membrane module comprising a vessel and at least one hollow-fiber membrane element according to claim 1 charged in the vessel.

8. The hollow-fiber membrane module according to claim 7, wherein the number of winds per element length in a region from the outermost layer of the wound hollow-fiber membrane body to maximally three quarters of the thickness of the wound hollow-fiber membrane body is 0.33 to 1.75.

9. The hollow-fiber membrane module according to claim 7, wherein element has an outer diameter greater than or equal to 130 mm.

10. The hollow-fiber membrane module according to claim 7, wherein the hollow-fiber membrane is formed of at least one resin selected from the group consisting of a cellulose acetate resin, a polyamide resin, and a sulfonated polysulfone resin.

11. The hollow-fiber membrane module according to claim 7, wherein the hollow-fiber membrane has an outer diameter of 160 to 270 μm.

12. The hollow-fiber membrane module according to claim 7, wherein the wound hollow-fiber membrane body has an outer diameter of 130 to 420 mm, and a length of 0.2 to 1.6 m.

* * * * *